United States Patent
Guo

[11] Patent Number: 6,103,840
[45] Date of Patent: Aug. 15, 2000

[54] PROCESS FOR MAKING ALLYLIC/EHTYLENIC COPOLYMERS

[75] Inventor: Shao Hua Guo, West Chester, Pa.

[73] Assignee: Arco Chemical Technology, L.P., Greenville, Del.

[21] Appl. No.: 09/454,937

[22] Filed: Dec. 3, 1999

Related U.S. Application Data

[63] Continuation of application No. 09/088,251, Jun. 1, 1998, abandoned.

[51] Int. Cl.$^7$ ........................................................ C08F 2/00
[52] U.S. Cl. ............................ 526/73; 526/310; 526/314; 526/319; 526/332; 526/347
[58] Field of Search ............................. 526/73, 319, 347, 526/332, 310

[56] References Cited

U.S. PATENT DOCUMENTS

| | | | |
|---|---|---|---|
| 2,630,430 | 3/1953 | Shokal et al. | 260/88.1 |
| 2,894,938 | 7/1959 | Chapin et al. | 260/88.1 |
| 2,940,946 | 6/1960 | Shokal et al. | 260/23 |
| 3,268,561 | 8/1966 | Peppel et al. | 260/348 |
| 3,726,848 | 4/1973 | Squire . | |
| 3,821,330 | 6/1974 | Free . | |
| 4,618,703 | 10/1986 | Thanawalla et al. | 560/209 |
| 5,382,642 | 1/1995 | Guo | 526/333 |
| 5,444,141 | 8/1995 | Guo | 526/347 |
| 5,475,073 | 12/1995 | Guo | 526/333 |
| 5,525,693 | 6/1996 | Guo | 526/329.2 |

*Primary Examiner*—Fred Zitomer
*Attorney, Agent, or Firm*—Jonathan L. Schuchardt

[57] ABSTRACT

An improved process for making allylic/ethylenic copolymers is disclosed. Increasing the reaction temperature during addition of the ethylenic monomer/initiator mixture results in a substantial increase in the polymer yield obtained compared with the yield from a conventional process in which a constant temperature is used. Copolymers made by the process include valuable coating resins such as styrene-allyl alcohol and hydroxy-functional acrylic copolymers.

20 Claims, No Drawings

PROCESS FOR MAKING ALLYLIC/ EHTYLENIC COPOLYMERS

This application is a continuation of application Ser. No. 09/088,251, filed Jun. 1, 1998, abandoned.

FIELD OF THE INVENTION

The invention relates to copolymers derived from allylic and ethylenic monomers, such as styrene-allyl alcohol copolymers and hydroxy-functional acrylic copolymers. In particular, the invention is an improved process that gives high yields of these copolymers, which are especially valuable as coating resins.

BACKGROUND OF THE INVENTION

A variety of copolymers of allylic and ethylenic monomers are well known, and many are particularly useful in the coatings industry. Examples are copolymers of allylic and vinyl aromatic monomers (such as styrene-allyl alcohol (SAA) copolymer), and copolymers of allylic and acrylate monomers. These copolymers offer performance advantages in end uses such as wood coatings, automotive topcoats, and powder coatings.

SAA copolymers (see U.S. Pat. Nos. 2,630,430, 2,894, 938, and 2,940,946) are resinous polyols useful for polyesters, fatty ester emulsions, alkyd and uralkyd coatings, melamines, and polyurethanes. They can be made in a batch process by charging a reactor with styrene, allyl alcohol, and a free-radical initiator, and heating the mixture at a temperature effective to polymerize the monomers. Recently, we described a semi-batch process for making these copolymers (see U.S. Pat. No. 5,444,141). We showed that yields improve significantly when the free-radical initiator is gradually added to the reaction mixture. More recently, we showed that good yields of SAA copolymers having higher styrene contents (and lower hydroxyl number) could be made using a similar process (see copending application Ser. No. 08/888,489, filed Jul. 8, 1997).

Like SAA copolymers, hydroxy-functional acrylic copolymers react with a wide assortment of crosslinking agents to give coatings. Hydroxyl functionality is usually incorporated by using a hydroxyalkyl acrylate monomer or, as we showed more recently (see U.S. Pat. Nos. 5,475,073 and 5,525,693), by using a hydroxy-functional allyl monomer such as allyl alcohol or an alkoxylated allyl alcohol.

The allylic copolymers described above are often best made using a "semi-batch" process because of the reactivity difference between the allyl monomer (sluggish), and the ethylenic monomer (fast). More specifically, all of the allylic monomer is usually present in the reactor at the start of the polymerization, while most of the ethylenic monomer and free-radical initiator are added to the reactor gradually during the course of the polymerization. We found that this "gradual addition" technique gives higher yields compared with the typical batch process. For example, in U.S. Pat. No. 5,444,141, we showed that gradual addition boosted yields of SAA copolymers by 30–50%.

Another common feature of these polymerizations is that the reaction temperature is normally kept constant during addition of the ethylenic monomer, which is preferably added at a decreasing rate (see, e.g., Example 1 of U.S. Pat. No. 5,444,141, and Example 1 of U.S. Pat. No. 5,475,073). In each case, the reaction temperature is kept constant throughout the addition of the ethylenic monomer.

In spite of the progress made earlier in obtaining higher yields of allylic/ethylenic copolymers, particularly SAA copolymers, there is still room for improvement since even the best yields are only 50–70%. For example, the process of U.S. Pat. No. 5,444,141 (Example 1) gives a 40% yield of SAA copolymer, and the process of U.S. Pat. No. 5,475, 073 (Example 1) gives a 67% yield of hydroxy-functional acrylate copolymer. A preferred process would give even higher yields of copolymers having desirable molecular weights, hydroxyl numbers, and allyl monomer contents. Ideally, the process would be cost-effective and easy to perform with conventional equipment.

SUMMARY OF THE INVENTION

The invention is an improved process for making allylic/ ethylenic copolymers. I surprisingly found that increasing the reaction temperature during monomer addition increases the yield of allylic/ethylenic copolymers compared with the yield obtained in a conventional process in which the temperature is kept essentially constant during monomer addition.

The process comprises charging a reactor with an allyl monomer and optionally, portions of the total amount to be used of an ethylenic monomer and a free-radical initiator. The mixture is heated initially at a temperature within the range of about 60° C. to about 145° C. The remaining ethylenic monomer and free-radical initiator are added gradually to the reaction mixture. While the monomer and initiator are added, the reaction temperature is increased to one within the range of about 150° C. to about 250° C.

The resulting allylic/ethylenic copolymers are valuable intermediates for a wide variety of coating systems, including polyesters, fatty ester emulsions, alkyd and uralkyd coatings, melamines, and polyurethanes.

DETAILED DESCRIPTION OF THE INVENTION

The invention is a process for making copolymers derived from allyl and ethylenic monomers.

Allyl monomers useful in the process contain at least one allyl or substituted allyl group ($CH_2$=CR—$CH_2$—, where R is hydrogen or an alkyl group). Preferred allyl monomers include allylic alcohols, allyl ethers, allyl esters, allyl amines, and allyl carbonates.

Allylic alcohols used in the process preferably have the general structure $CH_2$=CR—$CH_2$—OH, in which R is hydrogen or a $C_1$–$C_{10}$ alkyl group. Suitable allylic alcohols include, for example, allyl alcohol, methallyl alcohol, 2-ethyl-2-propen-1-ol, 2-pentyl-2-propen-1-ol, and the like, and mixtures thereof. Allyl alcohol and methallyl alcohol are particularly preferred.

Suitable allylic alcohols also include alkoxylated allylic alcohols of the formula $CH_2$=CR'—$CH_2$—$(A)_n$—OH in which R' is hydrogen or methyl, A is a $C_2$–$C_4$ oxyalkylene group, and n, which is the average number of oxyalkylene units in the alkoxylated allylic alcohol, has a value within the range of about 1 to about 5. Suitable propoxylated allyl alcohols can be made, for example, by reacting allyl alcohol with up to 5 equivalents of propylene oxide in the presence of a basic catalyst, as is described in U.S. Pat. Nos. 3,268, 561 and 4,618,703, the teachings of which are incorporated herein by reference. Particularly preferred are propoxylated allyl alcohols for which n has a value within the range of 1 to 2.

Preferred allyl ethers have the general structure: $CH_2$=CR—$CH_2$—O—R' in which R is selected from the group consisting of hydrogen and $C_1$–$C_5$ alkyl, and R' is a saturated linear, branched, or cyclic $C_1-C_{30}$ alkyl, aryl, or aralkyl group. Suitable allyl ethers also include epoxy-functional allyl ethers (epoxy allyl ethers) such as allyl glycidyl ether. Other suitable allyl ethers include, for example, allyl methyl ether, allyl ethyl ether, allyl tert-butyl ether, allyl methylbenzyl ether, and the like, and mixtures thereof.

Allyl esters can also be used in the process of the invention. Preferred allyl esters have the general structure: $CH_2=CR—CH_2—O—CO—R'$ in which R is selected from the group consisting of hydrogen and $C_1-C_5$ alkyl, and R' is hydrogen or a saturated or unsaturated linear, branched, or cyclic $C_1-C_{30}$ alkyl, aryl, or aralkyl group. Suitable allyl esters include, for example, allyl formate, allyl acetate, allyl butyrate, allyl benzoate, methallyl acetate, allyl fatty esters, and the like, and mixtures thereof. Particularly preferred are allyl esters derived from allyl alcohol and methallyl alcohol.

Most preferred are $C_1-C_5$ alkyl esters of allyl alcohol and methallyl alcohol.

Preferred allyl amines have the general structure: $CH_2=CR—CH_2—NR'R''$ in which R is selected from the group consisting of hydrogen and $C_1-C_5$ alkyl, and R' and R'' are hydrogen or a saturated or unsaturated linear, branched, or cyclic $C_1-C_{30}$ alkyl, aryl, or aralkyl group. Suitable allyl amines include, for example, allyl amine, N-methyl allyl amine, N-butyl allyl amine, N-benzyl allyl amine, N,N-dimethyl allyl amine, N,N-dibutyl allyl amine, and the like, and mixtures thereof.

Preferred allyl carbonates have the general structure: $CH_2=CR—CH_2—O—CO_2R'$, wherein R is selected from the group consisting of hydrogen and $C_1-C_5$ alkyl, and R' is a saturated linear, branched, or cyclic $C_1-C_{30}$ alkyl, aryl, or aralkyl group. Suitable allyl carbonates include, for example, methyl allyl carbonate, ethyl methallyl carbonate, and the like, and mixtures thereof.

Ethylenic monomers contain a carbon-carbon double bond that can copolymerize in a free-radical process with an allyl monomer. Preferred ethylenic monomers include, for example, vinyl aromatic monomers (e.g., styrene, alkyl-substituted styrenes, halogenated styrenes), (meth)acrylic acids and esters (e.g., acrylic acid, methyl methacrylate, butyl acrylate), conjugated dienes (e.g., 1,3-butadiene, isoprene), vinyl ethers, vinyl esters, vinyl halides, unsaturated anhydrides (e.g., maleic anhydride), unsaturated dicarboxylic acids, hydroxy-functional acrylic monomers (e.g., hydroxyethyl acrylate, hydroxypropyl acrylate), and mixtures thereof. Vinyl aromatic monomers, (meth)acrylic acids and esters, and hydroxy-functional acrylic monomers are particularly preferred. A minor proportion of a di- or poly-functional ethylenic monomer (e.g., divinylbenzene) can be included if a greater degree of crosslinking is desired.

The relative amounts of allyl monomer and ethylenic monomer can vary over a wide range. The actual amounts used will depend upon the nature of the monomers used, the desired molecular weight and functionality of the copolymer, the targeted end-use, and other factors that are well within the discretion of the skilled person. Preferably, however, the mole ratio of ethylenic monomer to allyl monomer will be within the range of about 0.1 to about 100; a more preferred range is from about 0.1 to about 10.

When the allyl monomer is an allylic alcohol and the ethylenic monomer is a vinyl aromatic monomer, the mole ratio (vinyl aromatic to allylic alcohol) is preferably within the range of about 0.1 to about 5. An excess of the allylic alcohol is used to make copolymers that have a relatively high content of allylic alcohol recurring units and correspondingly high hydroxyl numbers. Thus, a mole ratio less than about 1 is used to make the products with hydroxyl numbers from about 160 mg KOH/g to about 280 mg KOH/g. On the other hand, a mole ratio greater than about 1 is used to make products with relatively low hydroxyl content and hydroxyl numbers from about 50 mg KOH/g to about 160 mg KOH/g.

A free-radical initiator is included in the process of the invention. Suitable free-radical initiators are the peroxide and azo-type initiators well known to those skilled in the art. High-temperature peroxide initiators are preferred. Examples include di-tert-butylperoxide, tert-butylhydroperoxide, tert-butylperbenzoate, cumene hydroperoxide, hydrogen peroxide, and the like.

The free-radical initiator is used in an amount effective to copolymerize the allyl and ethylenic monomers. The actual amount used varies depending upon many factors, including which free-radical initiator is used, which monomers are present, reaction temperature, desired reaction time, the desired molecular weight and functionality of the polymer, and other factors. Generally, the total amount of free-radical initiator used is greater than about 0.1 wt. % based on the total weight of monomers. Preferably, an amount within the range of about 1 wt. % to about 25 wt. % based on the total weight of monomers is used; a more preferred range is from about 2 wt. % to about 15 wt. %.

Generally, the process of the invention is practiced as follows. A reactor is first charged with all of the allyl monomer and optionally, portions of the ethylenic monomer and free-radical initiator. The reaction mixture is heated at a temperature within the range of about 60° C. to about 145° C., more preferably from about 80° C. to about 125° C. The remaining monomer and free-radical initiator are added gradually to the reactor, preferably at an essentially constant rate. In a preferred mode, the reactor is charged initially with all of the allylic monomer, 10–30% of the total amount to be used of the ethylenic monomer, and 10–75% of the total amount to be used of the free-radical initiator. During addition of the monomer and initiator (which can be mixed, if desired, before adding), the reaction temperature is increased, preferably gradually or incrementally, to one within the range of about 150° C. to about 250° C., preferably from about 150° C. to about 200° C., to produce an allylic/ethylenic copolymer. Increasing the reaction temperature enhances the yield of the copolymer compared with a process in which the monomer addition is performed at a constant temperature. When the polymerization is complete, residual unreacted monomers are preferably removed by distillation or wiped-film evaporation.

In a preferred process of the invention, the target product is a vinyl aromatic/allylic alcohol copolymer. The reactor is preferably charged with all of the allylic alcohol (preferably allyl alcohol) and optionally, portions of the total amount to be used of the vinyl aromatic monomer (preferably styrene) and free-radical initiator. The mixture is heated at a temperature within the range of about 80° C. to about 145° C. The remaining vinyl aromatic monomer and free-radical initiator are then gradually added to the reaction mixture, preferably at an essentially constant rate, while polymerization proceeds. During the monomer/initiator addition, the reaction temperature is increased, preferably gradually or incrementally, to a maximum value within the range of about 150° C. to about 250° C. The resulting product is a vinyl aromatic/allylic alcohol copolymer having a number average molecular weight within the range of about 500 to about 10,000 and a hydroxyl number within the range of about 50 mg KOH/g to about 280 mg KOH/g.

I surprisingly found that increasing the reaction temperature during the course of the polymerization results in an enhanced yield of the copolymer. Example 1 and Comparative Example 2 (below) show that the yield of styrene-allyl alcohol copolymer (target hydroxyl number=200 mg KOH/g) increases from 40% to 66% (a 65% increase in yield) when the temperature ramping step is used. Example 3 and Comparative Example 4 show an even more dramatic increase (from 30% to 60% yield) in making a different styrene-allyl alcohol copolymer (target hydroxyl number= 260 mg KOH/g). The yield increases are unexpected from the prior art because similar known processes add the monomer and initiator at a constant temperature.

The process of the invention is well-suited to the preparation of all kinds of styrene-allyl alcohol (SAA) copolymers. Two varieties of SAA copolymers have long been commerically available. These have been used commonly as intermediates for making thermoset polymers such as polyesters, polyurethanes, melamines, alkyds, and uralkyds. Once type, known generally as "SAA 100 resinous polyol," has a hydroxyl number of about 200 mg KOH/g and a number average molecular weight of about 1500. Another is "SAA 101 resinous polyol," which has a hydroxyl number of about 260 mg KOH/g, and a number average molecular weight of about 1200.

The process is also valuable for making newer varieties of SAA copolymers, such as the ones with lower hydroxyl contents described in copending application Ser. No. 08/888, 489. Those products have hydroxyl numbers generally within the range of about 50 to about 150 mg KOH/g and number average molecular weights within the range of about 2000 to about 10,000.

The process can also be used to make a wide variety of allylic/acrylic copolymers. Preferably, the acrylic monomer will be a (meth)acrylic acid or ester or a hydroxyalkyl(meth) acrylate ester. The resulting copolymers preferably have number average molecular weights within the range of about 500 to about 10,000 and hydroxyl numbers within the range of about 20 mg KOH/g to about 500 mg KOH/g. The allylic/acrylic copolymers or resins react with traditional crosslinking agents (isocyanates, melamines, anhydrides, epoxies, or the like) to give valuable coatings.

The invention provides higher yields of allylic/ethylenic copolymers than were available from conventional processes in which no temperature ramping is used during monomer addition. The yield increases mean higher operating efficiency, less unreacted monomer to recover and recycle, and more product from each cycle. Importantly, the process increases yields without adversely affecting the copolymer structure, molecular weight, or hydroxyl functionality: the products obtained meet the target specifications for a variety of end uses.

The allylic/ethylenic copolymers made by the process of the invention are useful intermediates for preparing a variety of derivatives. For example, the copolymer, optionally combined with glycerin or another polyol, can be partially or fully esterified with a fatty acid to give an alkyd resin. In addition, the copolymers are useful in uralkyd compositions, melamine-based coatings, polyurethanes, and unsaturated polyester resins. Each of these applications is described in more detail in U.S. Pat. No. 5,382,642, the teachings of which are incorporated herein by reference. Copolymers made by the process of the invention are valuable for many end uses, including, e.g., wood finishes, industrial coatings, powder coatings, and automotive coatings. In sum, the copolymers of the invention have wide utility limited only by the imagination of the skilled practitioner.

The following examples merely illustrate the invention. Those skilled in the art will recognize many variations that are within the spirit of the invention and scope of the claims.

EXAMPLE 1

Preparation of a Styrene-Allyl Alcohol Copolymer with Programmed Temperature Increase during Monomer/initiator Addition Allyl alcohol (329 g) is charged to a one-liter, stainless-steel reactor equipped with addition pump, agitator, oil heating jacket, temperature controller, and inlets for nitrogen or vacuum. Styrene (329 g) and di-tert-butylperoxide (35 g) are mixed. An initial charge (43 g) of this mixture is added to the reactor, and the remainder (321 g) is put into the addition pump. After purging three times with nitrogen, the reactor is sealed, and the contents are heated to 125° C. The styrene/initiator mixture is added gradually to the reactor over 8 h at a constant rate.

The reaction temperature is gradually increased during the reaction as follows: first hour: 125° C.; second hour 130° C.; third hour: 135° C.; fourth hour: 140° C.; fifth hour: 145° C.; sixth hour: 150° C.; seventh hour: 155° C.; eighth hour: 160° C.

Heating continues at 160° C. for an additional 0.5 h. Unreacted monomers are removed from the product by vacuum distillation at 160° C. The product, 450 g of a styrene-allyl alcohol copolymer (66% yield based on the total weight of monomers), is isolated and characterized (hydroxyl number=212 mg KOH/g; Mn=1940; Mw=5550). It has 21 wt. % of recurring units from allyl alcohol and 70 wt. % of recurring units from styrene.

COMPARATIVE EXAMPLE 2

Preparation of a Styrene-Allyl Alcohol Copolymer with No Programmed Temperature Increase during Monomer/initiator Addition The procedure of U.S. Pat. No. 5,444,141, Example 1 is followed.

Allyl alcohol (500 g), styrene (67 g), and di-tert-butylperoxide (16 g) are charged to a one-liter stainless-steel reactor equipped with addition pump, agitator, steam heating jacket, temperature controller, and inlets for nitrogen or vacuum. After purging three times with nitrogen, the reactor is sealed, and the contents are heated to 145° C. Di-tert-butylperoxide (8 g) is mixed with styrene (234 g), and this mixture is pumped into the reactor over 7 h at 145° C. at a decreasing rate.

The addition rates are as follows: 50 g/h for the first hour, 45 g/h for the second hour, 40 g/h for the third hour, 35 g/h for the fourth hour, 30 g/h for the fifth hour, 24 g/h for the sixth hour, and 18 g/h for the seventh hour. Heating continues at 145° C. for an additional 0.5 h.

Unreacted monomers are removed from the product by vacuum distillation. The last traces of unreacted monomers are removed by addition of water and stripping under vacuum. The product, 322 g of a styrene-allyl alcohol copolymer (40% yield based on the total weight of monomers), is isolated and characterized (hydroxyl number=199 mg KOH/g; Mn=1500; Mw=3400).

EXAMPLE 3

Preparation of a Styrene-Allyl Alcohol Copolymer with Programmed Temperature Increase during Monomer/Initiator Addition The procedure of Example 1 is followed with a greater ratio of allyl alcohol to styrene (400 g of allyl alcohol; 329 g of styrene) to make a product having a target hydroxyl number of about 260 mg KOH/g.

After removing unreacted monomers by vacuum distillation, the styrene-allyl alcohol copolymer product (449 g) is isolated and characterized (hydroxyl number=249 mg KOH/g; Mn=1500; Mw=4200). The yield is 60% based on the total weight of monomers used.

COMPARATIVE EXAMPLE 4

The procedure of U.S. Pat. No. 5,444,141, Example 8 is followed. After removing unreacted monomers by vacuum distillation, the styrene-allyl alcohol copolymer product is isolated and characterized (hydroxyl number=251 mg KOH/g; Mn=1100; Mw=2260). The yield is 30% based on the total weight of monomers used.

EXAMPLE 5

Preparation of a Hydroxy-Functional Acrylic Resin

A two-liter glass reactor equipped with agitator, heating mantle, temperature controller, nitrogen purge device, and jacketed addition funnel is charged with propoxylated allyl alcohol (average of 1.0 oxypropylene units, 397 g) and t-amylperoxy-2-ethylhexanoate (6.0 g). N-butyl acrylate (136 g), styrene (136 g), methyl methacrylate (136 g), and butyl methacrylate (136 g) are mixed and purged with nitrogen. A portion of the monomer mixture (60 g) is added to the reactor. The remaining monomer mixture is combined with t-amylperoxy-2-ethylhexanoate (22.4 g), purged with nitrogen, and charged to the addition funnel. The mixture in the addition funnel is kept at 5° C. using an external chiller. After purging the reactor three times with nitrogen, the contents are heated to 145° C. Part of the monomer/initiator mixture is added to the reactor at 145° C. at the following rates: first hour: 126 g/h; second hour: 111 g/h; third hour: 94 g/h.

The reaction temperature is then increased to 155° C. Monomer addition continues at 155° C. as follows: fourth hour: 94 g/h; fifth hour: 83 g/h. After completing the monomer addition, the reaction mixture is heated for another 0.5 h at 155° C. Residual unreacted monomers are removed by distillation at up to 175° C. The resulting copolymer resin has Mw=6130, Mn=2850, hydroxyl number=129 mg KOH/g. The yield is 88% based on the total amount of monomers used.

The preceding examples are meant only as illustrations; the following claims define the scope of the invention.

I claim:

1. A process for making an allylic/ethylenic copolymer, said process comprising:
    a) charging a reactor with an allyl monomer and optionally, portions of the total amount to be used of an ethylenic monomer and a free-radical initiator;
    b) heating the reaction mixture at a temperature within the range of about 60° C. to about 145° C.;
    c) gradually adding to the reaction mixture the remaining ethylenic monomer and free-radical initiator; and
    d) during step (c), increasing the reaction temperature to one within the range of about 150° C. to about 250° C. to produce an allylic/ethylenic copolymer having a number average molecular weight within the range of about 500 to about 10,000;
    wherein the mole ratio of ethylenic monomer to allyl monomer used in the process is within the range of about 0.1 to about 10; and the yield of the copolymer is enhanced as a result of the increase in temperature in steps (c) and (d).

2. The process of claim 1 wherein the allyl monomer is selected from the group consisting of allylic alcohols, allyl ethers, allyl esters, allyl amines, allyl carbonates, and mixtures thereof.

3. The process of claim 1 wherein the ethylenic monomer is selected from the group consisting of vinyl aromatic monomers, (meth)acrylic acids and esters, conjugated dienes, vinyl ethers, vinyl esters, vinyl halides, unsaturated anhydrides, unsaturated dicarboxylic acids, hydroxy-functional acrylic monomers, and mixtures thereof.

4. The process of claim 1 wherein the reactor is initially charged with 10–30% of the total amount to be used of the ethylenic monomer, and 10–75% of the total amount to be used of the free-radical initiator.

5. The process of claim 1 wherein the reaction temperature is gradually increased to one within the range of about 150° C. to about 200° C.

6. The process of claim 1 wherein the monomer and initiator addition in step (c) is performed at an essentially constant rate.

7. A process for making a vinyl aromatic/allylic alcohol copolymer, said process comprising:
    a) charging a reactor with an allylic alcohol and optionally, portions of the total amount to be used of a vinyl aromatic monomer and a free-radical initiator;
    b) heating the reaction mixture at a temperature within the range of about 80° C. to about 145° C.;
    c) gradually adding to the reaction mixture the remaining vinyl aromatic monomer and free-radical initiator; and
    d) during step (c), increasing the reaction temperature to one within the range of about 150° C. to about 250° C. to produce a vinyl aromatic/allylic alcohol copolymer having a number average molecular weight within the range of about 500 to about 10,000 and a hydroxyl number within the range of about 50 mg KOH/g to about 280 mg KOH/g;
    wherein the mole ratio of vinyl aromatic monomer to allylic alcohol used in the process is within the range of about 0.1 to about 5, and the yield of the copolymer is enhanced as a result of the increase in temperature in steps (c) and (d).

8. The process of claim 7 wherein the monomer and initiator addition in step (c) is performed at an essentially constant rate.

9. The process of claim 7 wherein the vinyl aromatic monomer is selected from the group consisting of styrene, alkylated styrenes, and halogenated styrenes.

10. The process of claim 7 wherein the allylic alcohol is selected from the group consisting of allyl alcohol, methallyl alcohol, and alkoxylated allyl alcohols.

11. The process of claim 7 wherein the allylic alcohol has the formula: $CH_2=CH-CH_2-(A)_n-OH$ in which A is an oxypropylene group, and n, which is the average number of oxypropylene groups in the allylic alcohol, has a value within the range of 1 to 2.

12. The process of claim 7 wherein the reactor is initially charged with 10–30% of the total amount to be used of vinyl aromatic monomer and 10–75% of the total amount to be used of the free-radical initiator.

13. The process of claim 7 wherein the allylic alcohol is allyl alcohol, the vinyl aromatic monomer is styrene, and the resulting styrene/allyl alcohol copolymer has a number average molecular weight within the range of about 2000 to about 4000 and a hydroxyl number within the range of about 105 mg KOH/g to about 145 mg KOH/g.

14. The process of claim 7 wherein the allylic alcohol is allyl alcohol, the vinyl aromatic monomer is styrene, and the resulting styrene/allyl alcohol copolymer has a number average molecular weight within the range of about 500 to about 2000 and a hydroxyl number within the range of about 180 mg KOH/g to about 280 mg KOH/g.

15. A process for making an allylic/acrylic copolymer, said process comprising:
- a) charging a reactor with an allyl monomer and optionally, portions of the total amount to be used of a free-radical initiator and an acrylic monomer selected from the group consisting of (meth)acrylic acids, (meth)acrylate esters, and hydroxyalkyl(meth)acrylate esters;
- b) heating the reaction mixture at a temperature within the range of about 80° C. to about 145° C.;
- c) gradually adding to the reaction mixture the remaining acrylic monomer and free-radical initiator; and
- d) during step (c), increasing the reaction temperature to one within the range of about 150° C. to about 250° C. to produce an allylic/acrylic copolymer having a number average molecular weight within the range of about 500 to about 10,000;

wherein the mole ratio of acrylic monomer to allyl monomer used in the process is within the range of about 0.1 to about 10; and the yield of the copolymer is enhanced as a result of the increase in temperature in steps (c) and (d).

16. The process of claim 15 wherein the allyl monomer is selected from the group consisting of allylic alcohols, allyl ethers, allyl esters, allyl amines, allyl carbonates, and mixtures thereof.

17. The process of claim 15 wherein the reactor is initially charged with 10–30% of the total amount to be used of the acrylic monomer, and 10–75% of the total amount to be used of the free-radical initiator.

18. The process of claim 15 wherein the reaction temperature is gradually increased to one within the range of about 160° C. to about 180° C.

19. The process of claim 15 wherein the resulting allylic/acrylic copolymer has a number average molecular weight within the range of about 500 to about 10,000 and a hydroxyl number within the range of about 20 mg KOH/g to about 500 mg KOH/g.

20. The process of claim 15 wherein the monomer and initiator addition in step (c) is performed at an essentially constant rate.

* * * * *